US007987116B2

(12) United States Patent
Vasconi et al.

(10) Patent No.: US 7,987,116 B2
(45) Date of Patent: Jul. 26, 2011

(54) INDUSTRY-WIDE BUSINESS TO BUSINESS EXCHANGE

(75) Inventors: Kevin Vasconi, Ann Arbor, MI (US); William Penn, Shelby Township, MI (US); David McGuffie, West Bloomfield, MI (US)

(73) Assignee: Covisint, LLC., Southfield, MI (US)

( * ) Notice: Subject to any disclaimer, the term of this patent is extended or adjusted under 35 U.S.C. 154(b) by 2335 days.

(21) Appl. No.: 09/968,621

(22) Filed: Oct. 2, 2001

(65) Prior Publication Data

US 2002/0062262 A1 May 23, 2002

Related U.S. Application Data

(60) Provisional application No. 60/236,740, filed on Oct. 2, 2000.

(51) Int. Cl.
*G06Q 30/00* (2006.01)
(52) U.S. Cl. ..................... 705/26.1; 705/27.1
(58) Field of Classification Search ............. 705/26
See application file for complete search history.

(56) References Cited

U.S. PATENT DOCUMENTS

| 5,974,395 | A | 10/1999 | Bellini et al. | |
| 6,125,391 | A | 9/2000 | Meltzer et al. | |
| 6,629,081 | B1 * | 9/2003 | Cornelius et al. | 705/30 |
| 6,766,361 | B1 * | 7/2004 | Venigalla | 709/217 |

OTHER PUBLICATIONS

Federal Trade Commission Clears Automakers' Online Marketplace ( Covisint, online marketplace for auto firm, to go ahead now that the FTC has decided the venture does not violate antitrust statutes ) , San Jose Mercury News , Sep. 12, 2000.*
Anonymous, Japanese automotive database and forecasts, Motor Business Japan, London: Third Quarter 1999, p. 137, 17 pages, Downloaded from the Internet on Dec. 6, 2004.*
McCormack, Steve, The great IT blunder, The Engineer, p. 23, Jan. 8, 1998. Downloaded from the Internet on Dec. 6, 200.*
Steinman, Cindy ,Ford drives cars on the information highway: on-line service gives users freedom of choice BuyerConnection ComputerWorld Canada, v.16(15) JI 28'00 p. 13.*
Steinman, Cindy, Canadians first for Ford on-line [Two test sites in Canada for Ford's BuyerConnection on-line service] Networ World Canada, v.10(13) JI 14'00 p. 6.*
Erich Luening, Exodus nabs hosting deal with Covisint, CNET News.com, Published on ZDNet News: May 11, 2001, 4:00 AM PT, 5 pages, downloaded from the Internet, on May 30, 2006.*
Ralph Kisiel, Information Technology: Online trade exchanges: what went wrong? Automotive News, Apr. 29, 20002. 3 pages, downloaded from the Internet on May 30, 2006.*

* cited by examiner

*Primary Examiner* — James Zurita
(74) *Attorney, Agent, or Firm* — McDermott Will & Emery LLP

(57) ABSTRACT

A industry wide computerized business to business exchange permits participants in the industry to satisfy their procurement needs and manage their supply chains from a single log on to the exchange. An exchange architecture provides a particularly convenient platform for implementation of the exchange. Users connect to a portal services subsystem. User systems connect to an integration services platform. A platform services subsystem provides services to the portal services and to the integration services subsystems and to application programs that can be accessed through those subsystems. The application programs may include, for example, electronic procurement, collaborative product development applications and supply chain management. XML serves as the information currency for the exchange.

4 Claims, 14 Drawing Sheets

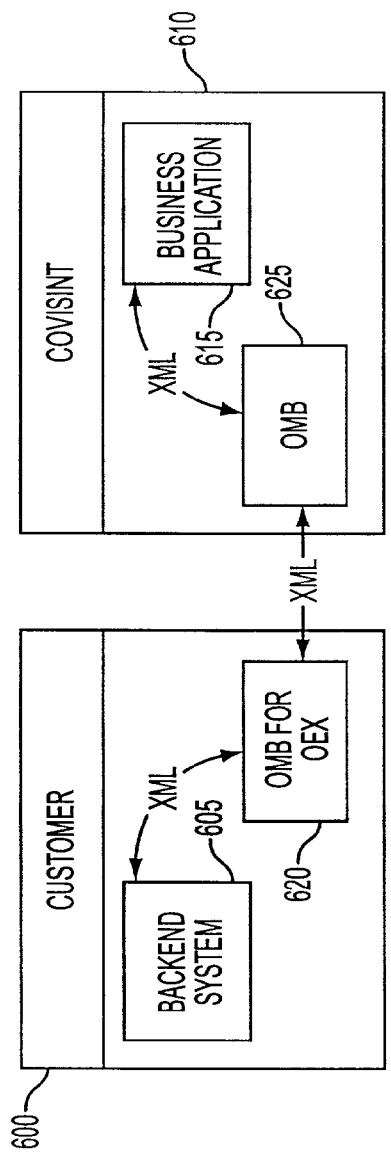
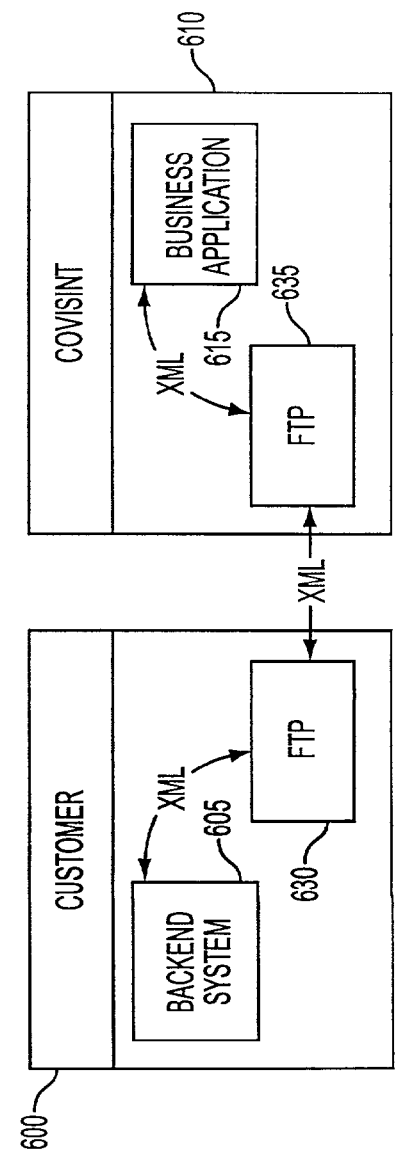

INDUSTRY-WIDE BUSINESS TO BUSINESS EXCHANGE

CROSS REFERENCE TO RELATED APPLICATIONS

This application claims priority from and is related to U.S. provisional application Ser. No. 60/236,740, filed Oct. 2, 2000. The contents of that provisional are hereby incorporated by reference in their entirety.

CROSS REFERENCE TO CD ROM APPENDICES

This application contains an appendix comprising 1 CD ROM containing instructions for implementations of various portions of the computer programs used to carry out the invention disclosed herein. The contents of this CD-ROMs are described in more detail on paper Appendix A attached to this document.

BACKGROUND OF THE INVENTION

1. Field of the Invention

The invention is directed toward computer systems, and more particularly to a computer system for implementing an industry-wide business to business exchange.

2. Description of Related Art

When looking at an industry, for example the automobile industry, one can see that there are several independent companies producing automobiles in competition with each other. A wide variety of parts, assemblies, subassemblies and services are required in a rather extensive supply chain in order to ensure that a particular automobile manufacturer has everything needed to assemble the final product, namely an automobile. Historically, each of the suppliers of goods and services, if computerized at all, had individualized systems, some proprietary and some open for carrying out their business. Historically, there have been no common hardware, software or data standards. Each company more or less assembled their own systems to meet their needs.

There have been some efforts at standardization. For example, the Electronic Data Interchange (EDI) standard was introduced. Development of EDI like standards also occurred in different countries. Because of this, the standards that evolved had not only an industry orientation but also a geographical one. The result was overlapping data structures across multiple industries and different geographies but there was not inter-operability among the standards.

The proliferation of multiple EDI standards increased the cost of implementing EDI. Cross-Industry players, such as transportation firms, found themselves having to learn and implement different EDI data structures depending on the industry they served and the region in which they operated. Standards that became the dominant form for conducting e-Commerce are the ANSI X12 in North America; TRADA-COMS in the United Kingdom; GENCOD in France (Retail); Uniform Communications Standard for the U.S. grocery industry; and VDA-SEDAS in Germany. Gradually, different industry groups came together to create one international data standard, EDIFACT (Electronic Data Interchange for Administration, Commerce and Transport). Today, most trade between companies in two different countries is based on the EDIFACT standard.

Concurrently, many companies began to practice Just-N-Time (JIT) inventory management. As long as goods and services are flowing smoothly, a manufacturer could reduce inventory costs by having the parts needed arrive just in time for assembly. That reduced the cost of inventory storage and management. Nevertheless, it created a situation in which individual suppliers might be adversely impacted by some occurrence and the impact of a suppliers delivery problems on the manufacturer might not be appreciated until it was too late to provide for alternative sources. Accordingly, there's arose a need for supply chain management which allows visibility of the status of all participants in an individual manufacturer's chain.

Anti-trust and administrators of anti-competitive laws, both in the U.S. and in foreign markets, have become active individually and collectively against an improper exercise of "monopoly" and power. As a result, it was virtually unthinkable that the major players in the industry, such as the automobile industry, could share purchasing systems without incurring a substantial potential for anti-trust sanctions.

Because of these conditions, the market place for goods and services provided to a major industry, such as the automobile industry, was fragmented and slow. A purchasing official needed to check multiple sources, one at a time, in order to determine the best price, availability or other decision-important information. Not only did one have to check with different sources, one needed to sign on to different systems, each having an interface that was different and unique to that particular company. If electronic connection was not available, then telephone or fax would be used to make inquiries or provide orders. This resulted in a very slow and inefficient procurement process for both the manufacturers and suppliers.

These conditions possibly actually inhibited competition by making it difficult for new suppliers to break into the market place and to make the products and services known to major purchasers. Further, individual companies would be required to market separately to different manufacturers in the same industry. Further, the absence of readily available pricing information resulted in higher cost and a slower adjustment to market place changes.

A few portals that were established were specific to a particular manufacturer and didn't reach across the entire industry. Further, branding that occurred on the portal was the branding of the portal and not that of the individual suppliers. Further, different catalogs from different sources needed to be maintained. There were some earlier attempts at vertical supply chain integration, but these were limited to a single manufacturer and not to the manufacturer's competitors.

Different forms were utilized for each of the various electronic systems and for each of the paper systems. This made the forms difficult to learn and the information, once learned, not transferable to other companies or suppliers.

SUMMARY OF THE INVENTION

The invention is directed to techniques for solving the problems of the prior art discussed above by providing an industry wide business to business exchange. A platform architecture is described that is particularly suited to the development and implementation of business to business exchanges.

Other features of the invention will become apparent from a description from a description of the invention as discussed in conjunction with the drawings in which:

BRIEF DESCRIPTION OF THE DRAWINGS

FIGS. 6A, 6B, 6C, and 6D illustrate respective techniques for connecting back-end legacy systems to applications of the business to business exchange in accordance with another aspect of the invention.

DETAILED DESCRIPTION OF THE INVENTION

Figure 1:
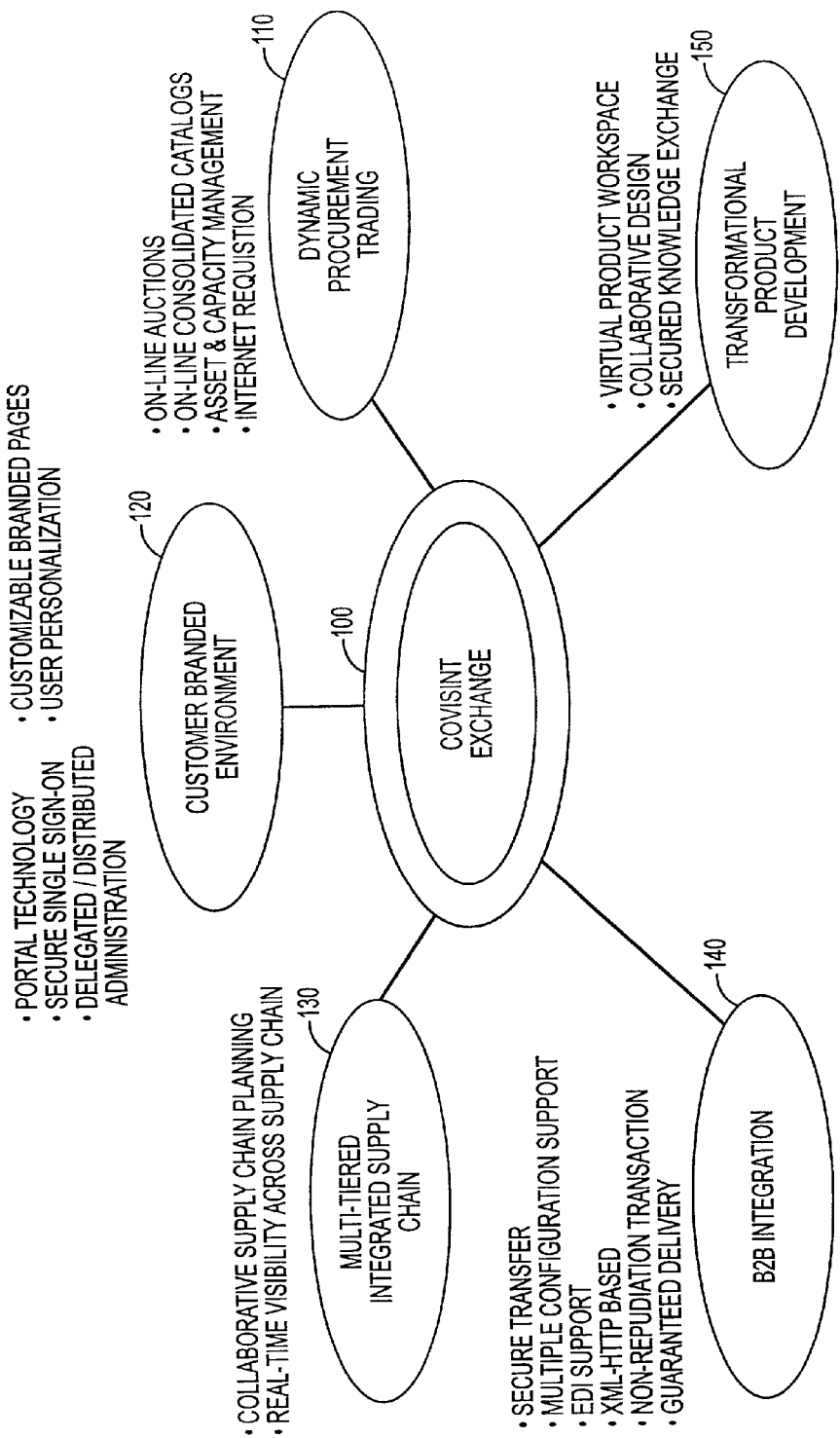
FIG. 1 is an illustration of high-level functionality provided by a business to business exchange in accordance with one aspect of the invention.

FIG. 1 is an illustration of high-level functionality provided by a business to business exchange in accordance with one aspect of the invention.

Covisint is a joint venture between Ford, General Motors and Daimler Chrysler. A business to business exchange in accordance with the invention is illustrated at 100 and as labeled "Covisint Exchange". The Covisint Exchange provides a dynamic procurement trading environment 110. This includes on-line options, on-line consolidated catalogs, asset and capacity management and Internet requisition. It also includes a customer branded environment which includes the use of a secure single sign-on with delegated and distributed administration of customer branded user pages which allows suppliers of goods and services to keep their own identity and to publish branded information on the system. User personalization for individual users is also a provided.

The Exchange permits multi-tier integrated supply chain management 130 including collaborative supply chain planning, and real-time visibility across supply channel components.

Business to Business integration 140 includes an infrastructure which supports secure transfer, multiple configurations including EDI and XML-HTTP based information transfer with non-repudiation of transaction and with guaranties for delivery. Transactions can be rendered safe from repudation by using encryption certificates to validate signatures. In one form, this might involve creating a digest of, for example, an order which is then encrypted with the users private key and which can be identified using the public key counterpart in a public key encryption scheme. Guaranteed delivery can be assured by providing contracts with individual users of the system which binds them to provide the necessary assurances for delivery. In one form this might require the posting of a bond as condition for using the system.

Figure 2:
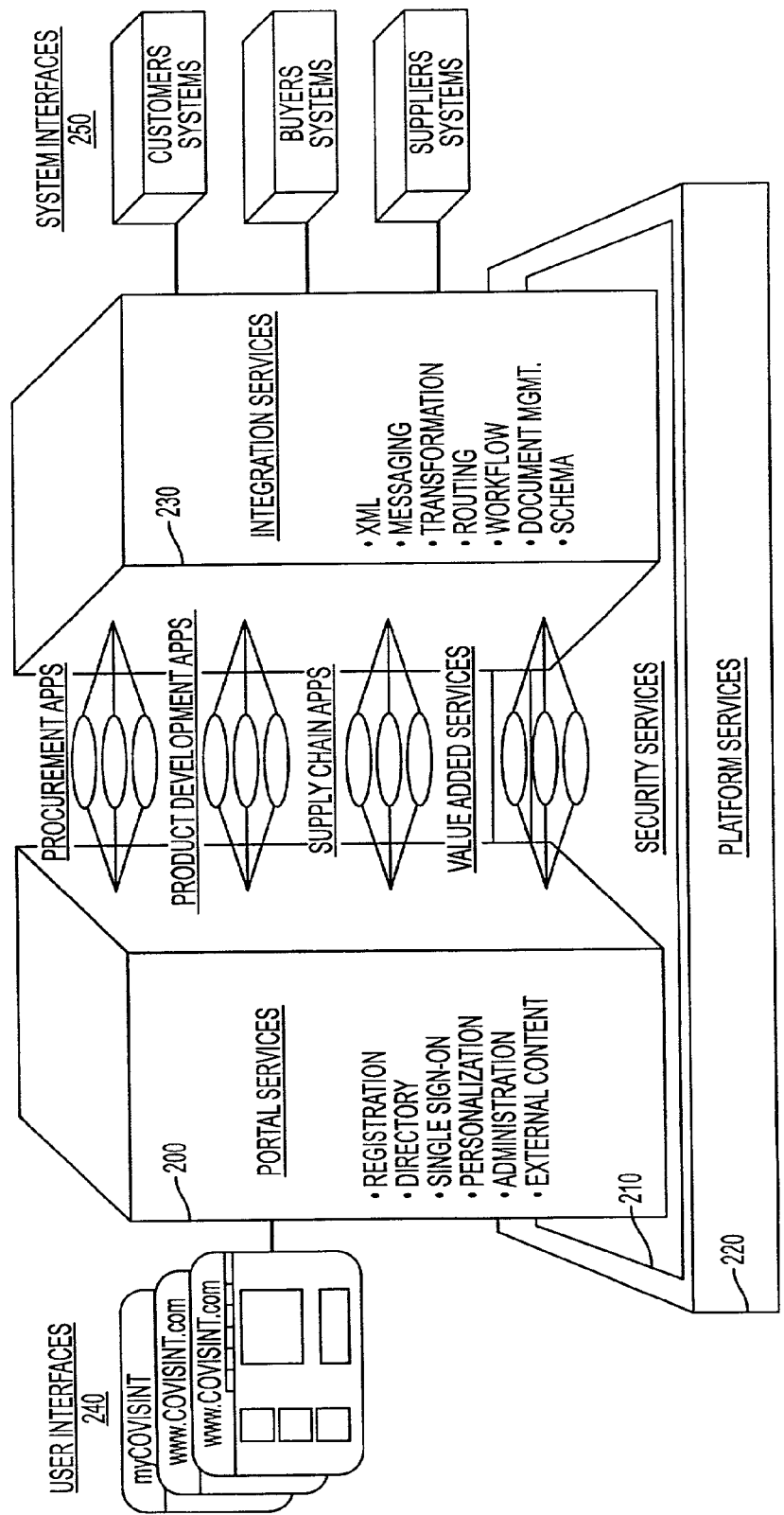
FIG. 2 is a block diagram illustrating a platform architecture, sometimes called the "Covisint U" for building a business to business exchange in accordance with one aspect of the invention.

FIG. 2 is a block diagram illustrating a platform architecture, sometimes called the "Covisint U" for building a business to business exchange in accordance with one aspect of the invention. Connection to a portal services subsystem 200 occurs by way of a plurality of user interfaces (240). In the figure, the interfaces labeled "www.COVISINT.com are interfaces that are appropriated for an Internet or private virtual network connection. The interface labeled "myCOVISINT" might be a proprietary interface from a dedicated system terminal located on the user's premises. Users might be typically individuals working for buyers, suppliers or originally equipment manufacturers in the supply chain leading, in this example, to the production of automobiles. The computerized systems of customers, buyers and suppliers each have a system interface 250 to a set of integration services 230. A variety of security services 210 and platform services 220 provide system live security and other services to the overall exchange. A variety of applications are accessible both to users and systems through the portal services and the integration services. Of course, security and other global type services are provided to ensure access only by authorized individuals within the scope of the system design. This particular platform architecture permits a developer to incorporate best of breed applications, which are scalable, secure and based on Internet standards.

Figure 3A:
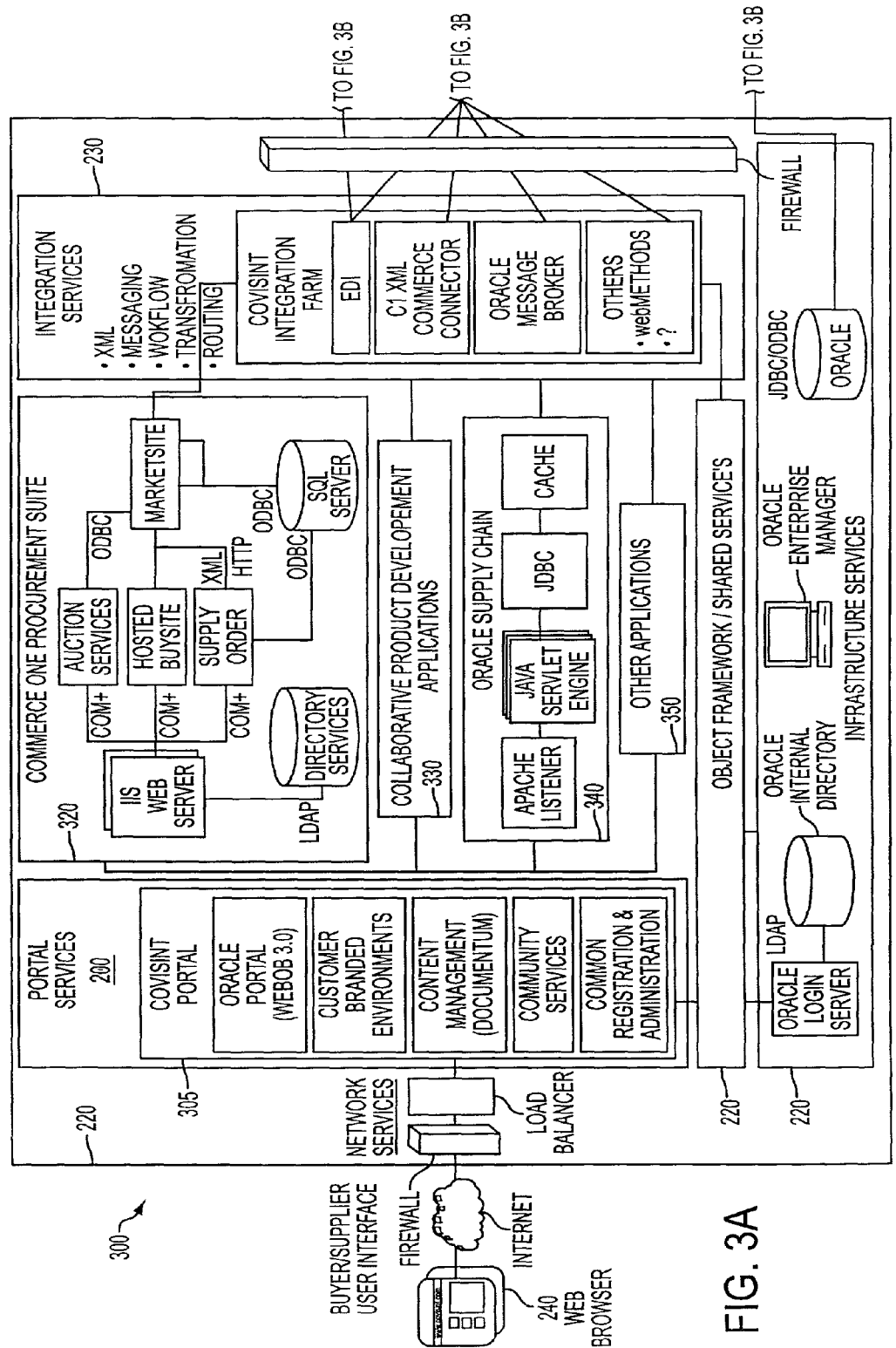
FIGS. 3A and 3B together constitute a block diagram showing an exemplary implementation of a business to business exchange using the Covisint U Platform.
Figure 3B:
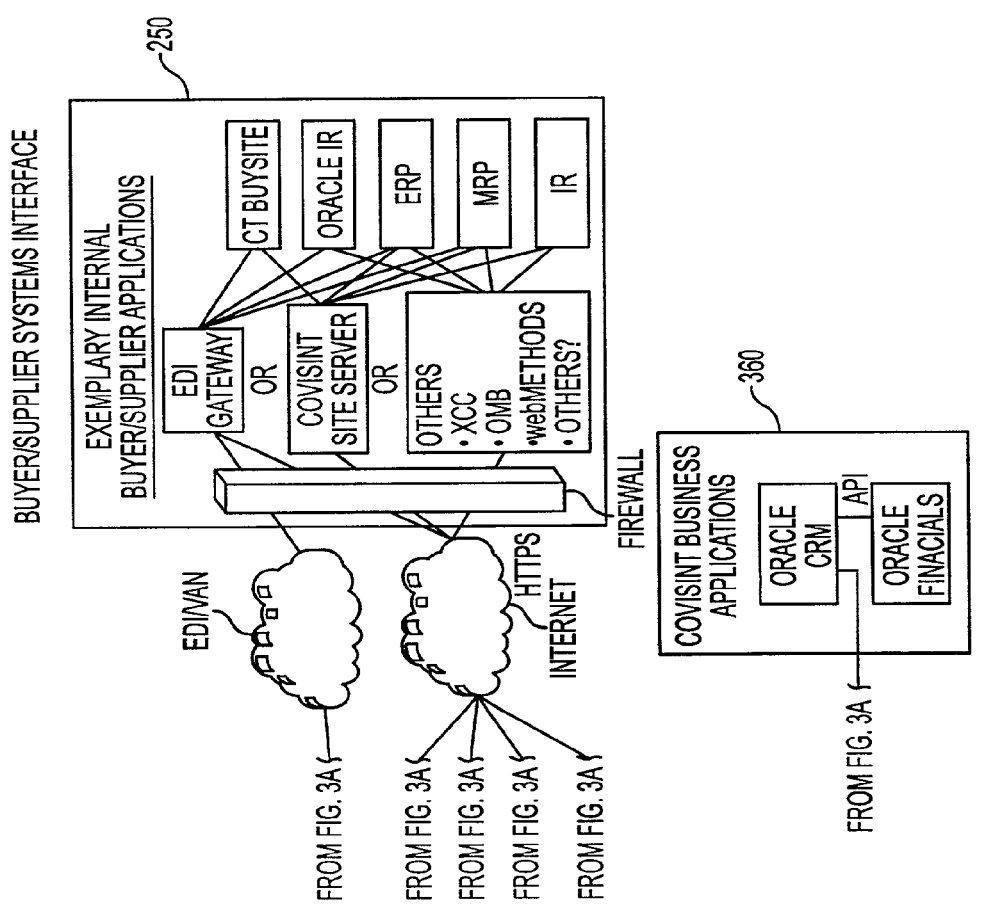

FIGS. 3A and 3B together constitute a block diagram showing an exemplary implementation of a business to business exchange using the Covisint U platform. Implementation, 300, includes portal services 200 and integration services 230 as well as infrastructure services and object framework/shared services 220. These components correspond to the corresponding numbers of the Covisint U architecture. In addition, a plurality of application programs are serviced from this architecture across the arms of the "U."

Turning first the portal services 200, the Covisint portal 305 includes a plurality of portal applications including Oracle portal, customer branded environments, content management, community services and common registration and administration. Oracle portal is implemented as WebDB 3.0. The customer branded environments permit customers to administer and manage their individual presence within the exchange including maintaining customer branded homepages and other pages. Content management is done using the Documentum package. Community services may include a variety of services such as e-mail, bulletin board, chat rooms and the like. Common registration and administration is part of the security framework and permits system administrators for both the exchange and for suppliers of goods and services to manage the security of their particular presence on the exchange. The Covisint integration farm 310 includes a process for handling EDI incoming data, a Commerce One XML Commerce Connector product, Oracle message broker and a variety of other applications as desired.

In this particular implementation, the applications available to users include a Commerce One procurement suite 320, collaborative product development applications 330, provided, for example, by Matrix One, Inc., Oracle Supply Chain software 340 and other applications 350 such as the idle asset/capacity management process described more hereinafter. As before, the exchange implementation is accessed by buyers and suppliers over a user interface 240 or by buyer's/supplier's systems over interface 250. A variety of exemplary buyer/supplier applications, which interface to the system are shown in box 250. In this implementation, the Covisint business to business exchange manages customer relations with its internal customers using Oracle customer relationship management software and Oracle financial packages shown in block 360. In the area of infrastructure services, an Oracle log in server permits access to an Oracle internal directory. An Oracle Enterprise Manager and an Oracle 8.0 database provides information accessible for use throughout the system.

Figure 4:
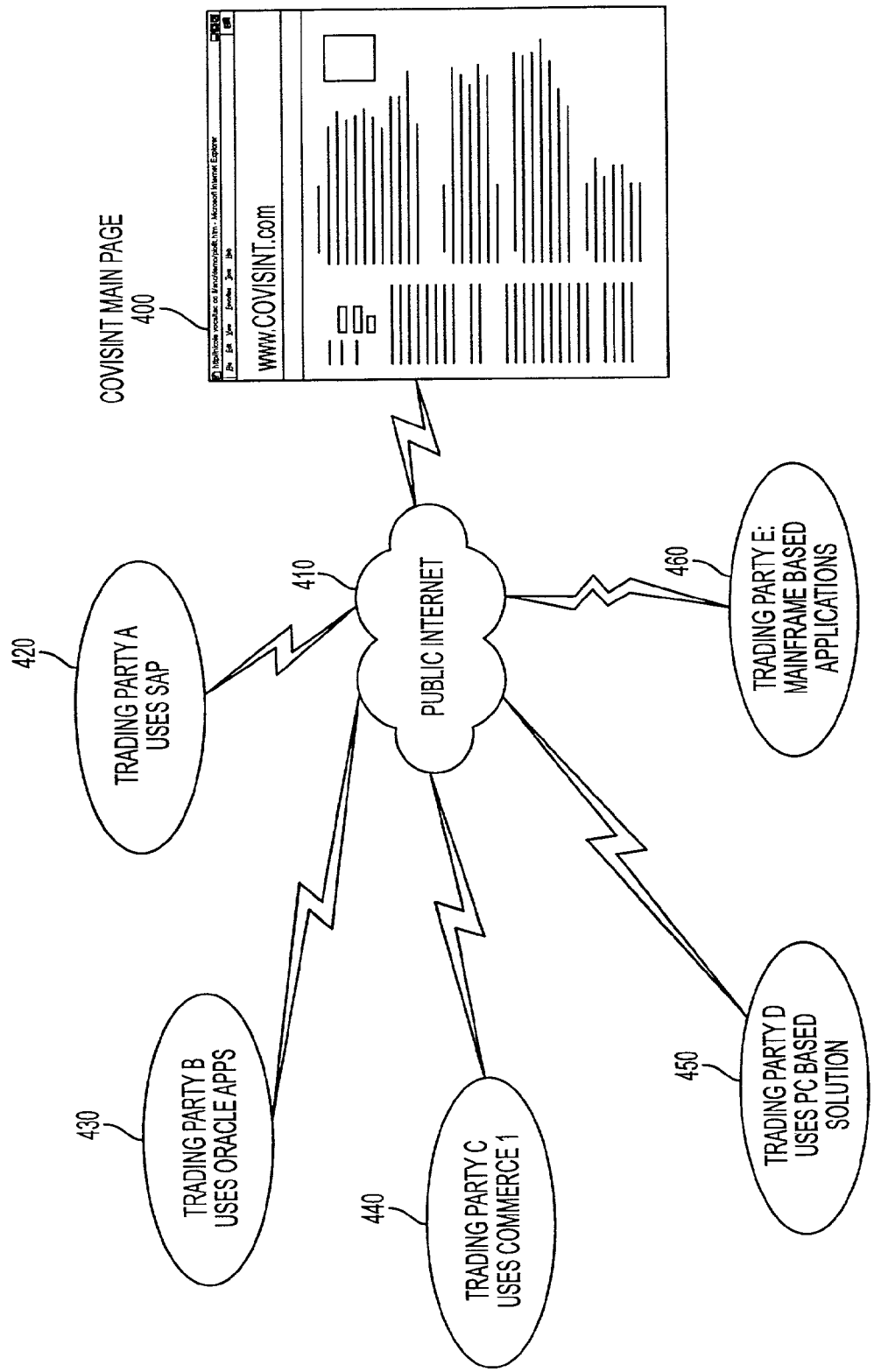
FIG. 4 is a diagram illustrating the diverse supplier systems commonly in use that maybe accommodated in a business to business exchange in accordance with one aspect of the invention.

FIG. 4 is a diagram illustrating the diverse systems commonly in use that may be accommodated in a business to business exchange in accordance with one aspect of the invention.

Trading parties A through E utilize a variety of different software packages to connect to over an internet connection or over a high performance network 410 to the business to business exchange main page 400. For illustration purposes, Trading Party A (420) may use SAP software, Trading Party B may use Oracle applications; Trading Party C may use Commerce One applications, Trading Party D may use the PC based solutions and Trading Party E may use mainframe based applications. All of these types of applications are preferably supported in order to achieve the maximum penetration of the market.

Figure 5:
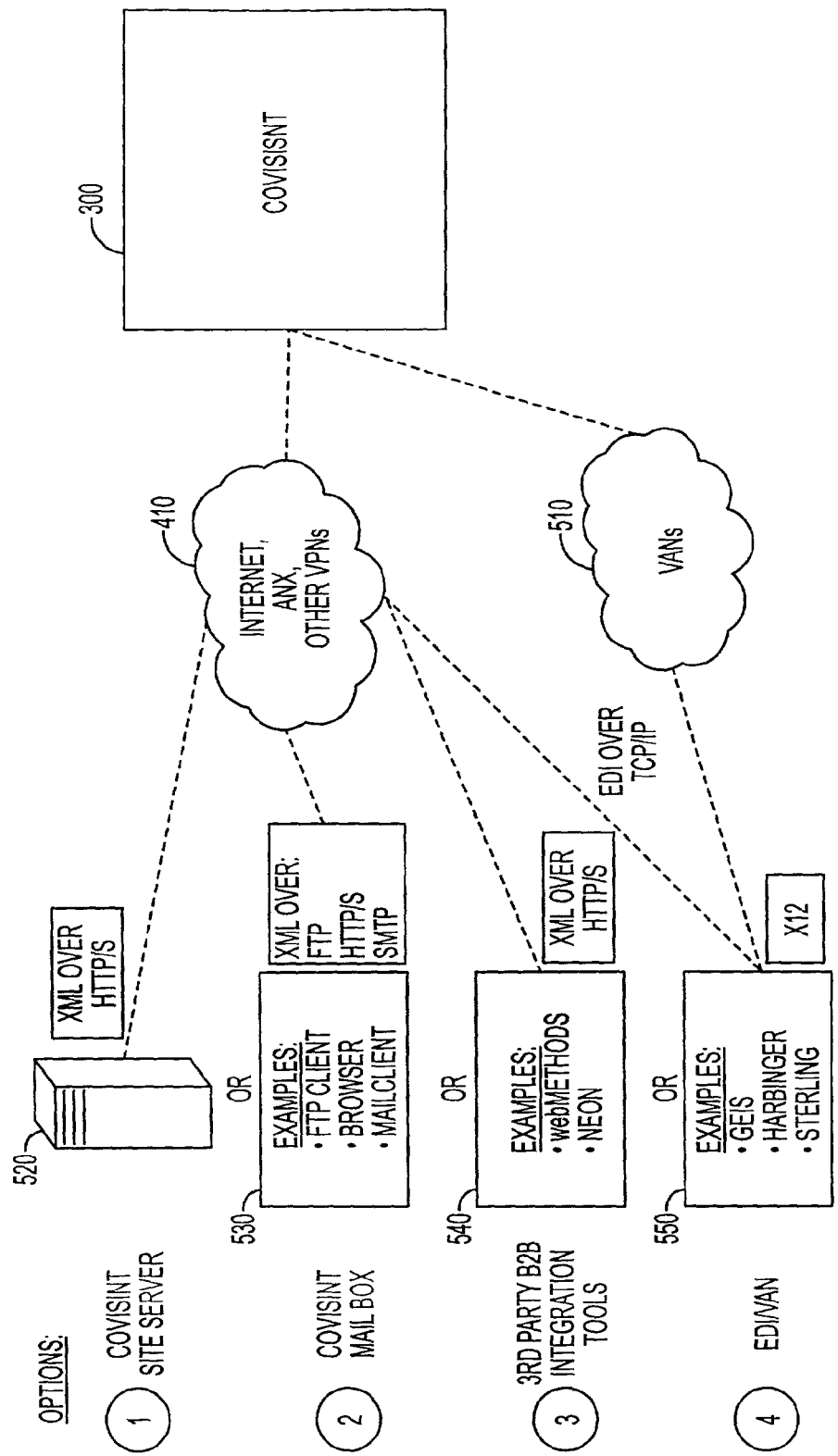
FIG. 5 is a block diagram illustrating different methods of connecting to an exchange in accordance with other aspects of the invention.

FIG. 5 is a block diagram illustrating different methods of connecting to the exchange 300. As before, connections to the exchange 300 may be made over the Internet or other high performance networks, such as ANX or a VPN (410). Alternatively, a user may connect over a value added network 510.

Considering the users, there are a number of techniques that which users may connect to the business to business exchange in accordance with the invention.

In one instance (520) a Covisint site server is provided by the exchange and placed on the customer's site to provide out-of-the-box access. Alternatively, a mail box 530 may be utilized for the client to send e-mail, which can be used in order to participate in system activities. In a third environment (540), a third party may connect to the network using a variety of integration tools. Another illustrative method of connecting is by use of an electronic data interchange value added network. Examples of these are shown in the boxes in the drawing and each has its advantages.

Where a Covisint site server is provided, it provides an immediate point of presence on the Covisint business to business exchange. It provides out of the box connectivity with guaranteed delivery, and security and remote management. It is convenient because it requires no action on the part of the user, other than to install the server and connect user terminals to it.

When a Covisint mailbox is utilized, essentially the exchange provides hosted connectivity with an instant on characteristic, low cost and low barrier to entry. In short, anybody can send an email and have it received by the system, interpreted and acted upon.

Another approach would be to have a third party site server. In this approach, a third party maintains a site to which a variety of other users may connect in order to provide access to the business to business exchange. It preserves a users existing investment and provides the subscriber with flexibility to leverage the best in class approach as the third party site administrator continues to improve and expand the site with the latest software to provide better service to its customers. Further, it promotes the adoption of open standards.

Another approach is the use of an electronic data interchange/value added network to connect to the business to business exchange. This preserves the existing investment in electronic data interchange equipment in software and provides a migration path to XML.

FIGS. 6A, 6B, 6C and 6D illustrate respective techniques for connecting back end legacy systems to applications of a business to business exchange in accordance with one aspect of the invention. In each of these figures, a customer 600 connects to the Covisint business to business exchange 610.

In FIG. 6A, the back end system 605 connects using, using XML, to an Oracle message broker 620 which then connects, using XML, to a corresponding Oracle message broker server 625 where the XML is extracted and sent to the business application 615 for processing. These links are bidirectional and so any response follows the same path in reverse.

FIG. 6B, the back end system provides XML to an FTP client/server 630 where it is transmitted to a corresponding FTP client/server 635 where the XML is extracted and provided to the business application 615, as discussed above.

Figure 6C:
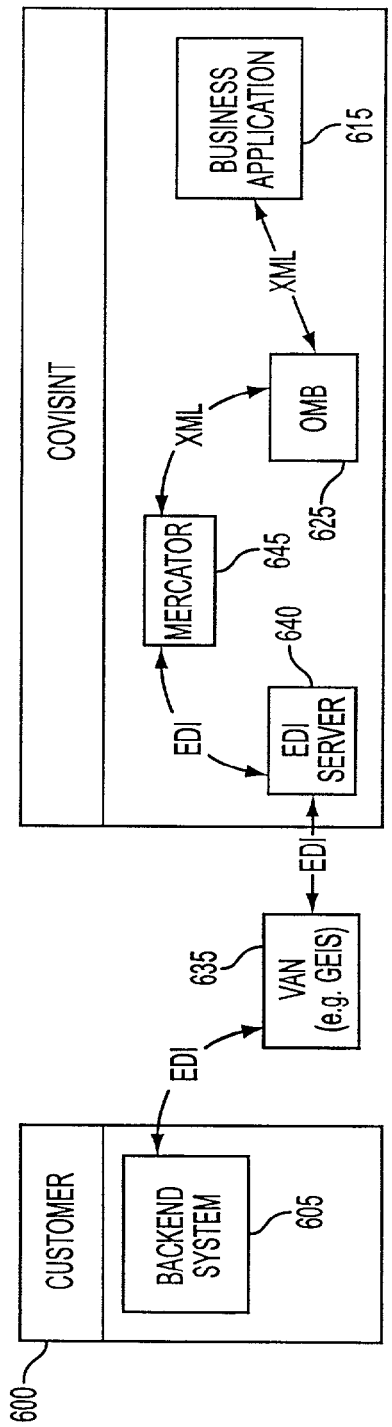

FIG. 6C, the customer back end system 605 connects using electronic data interchange to a value added network 635 which transports the EDI data to an EDI server 640 located out of the Covisint exchange. The EDI server connects to a Mercator translator 645 that extracts EDI information and translates it into an XML format for application to the Oracle message broker server that extracts the XML information to the business application 615.

Figure 6D:
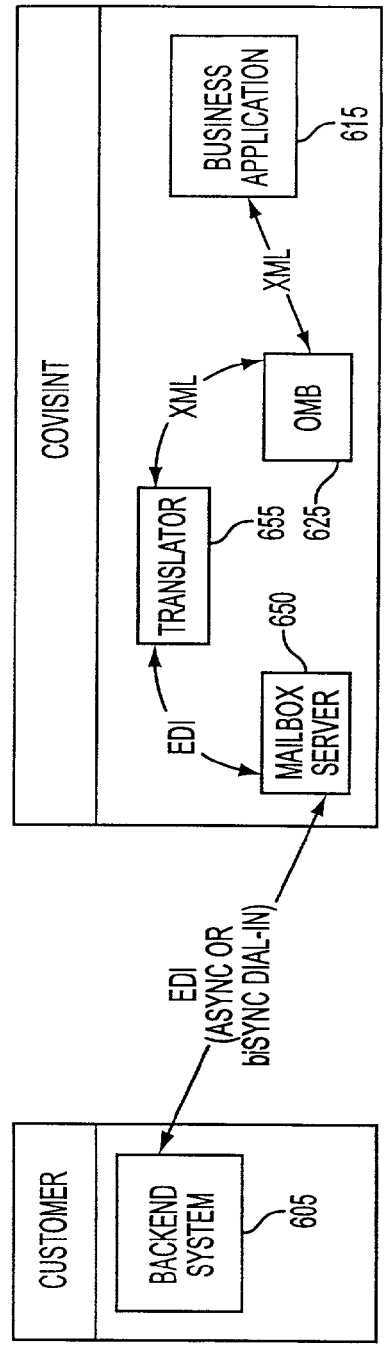

FIG. 6D, the back end system 605 connects using an async or biSync dial in connection and provides EDI formatted information to a mailbox server 650. The EDI information is extracted, applied to a translator 655 which provides XML to an Oracle message broker process 625 which then applies the XML to the business application for processing. Again, in each of the examples in FIGS. 6A, 6B, 6C and 6D these communication links are bidirectional so that the reverse the flow of information follows substantially the same path.

Figure 7:
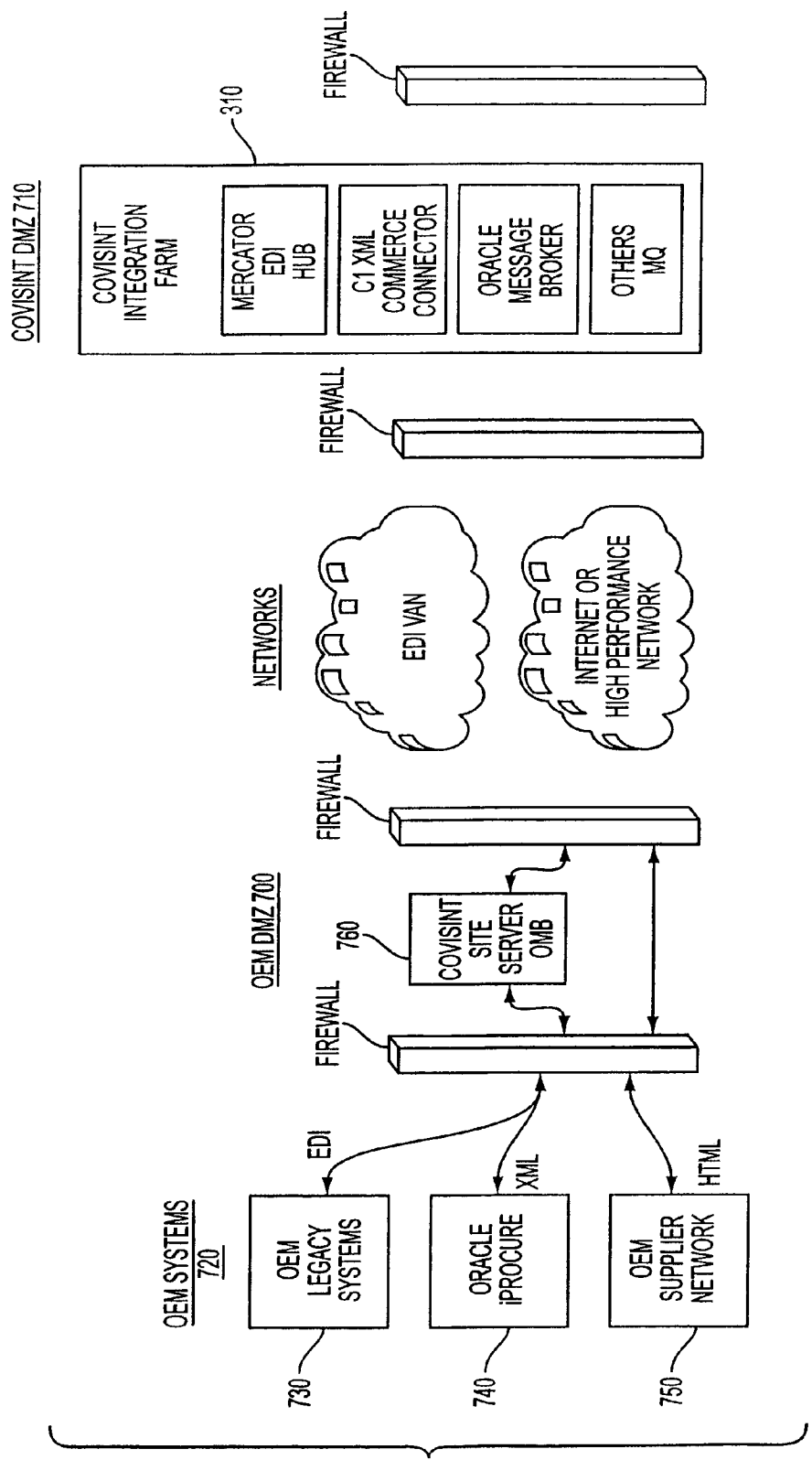
FIGS. 7, 8, and 9 illustrate respective network arrangements for achieving XML "dial tone" from a business to business exchange in accordance with one aspect of the invention.
Figure 8:
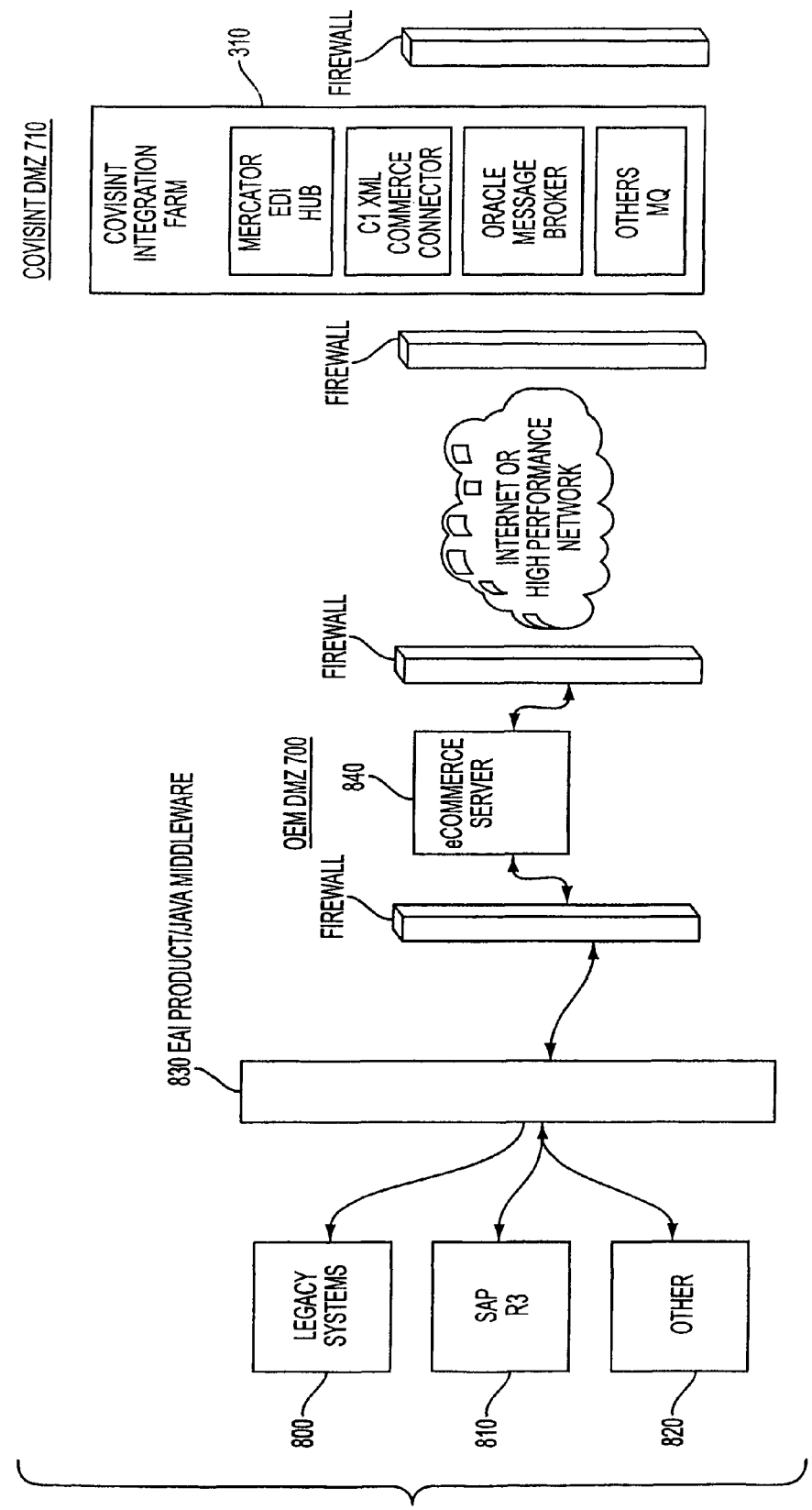
Figure 9:
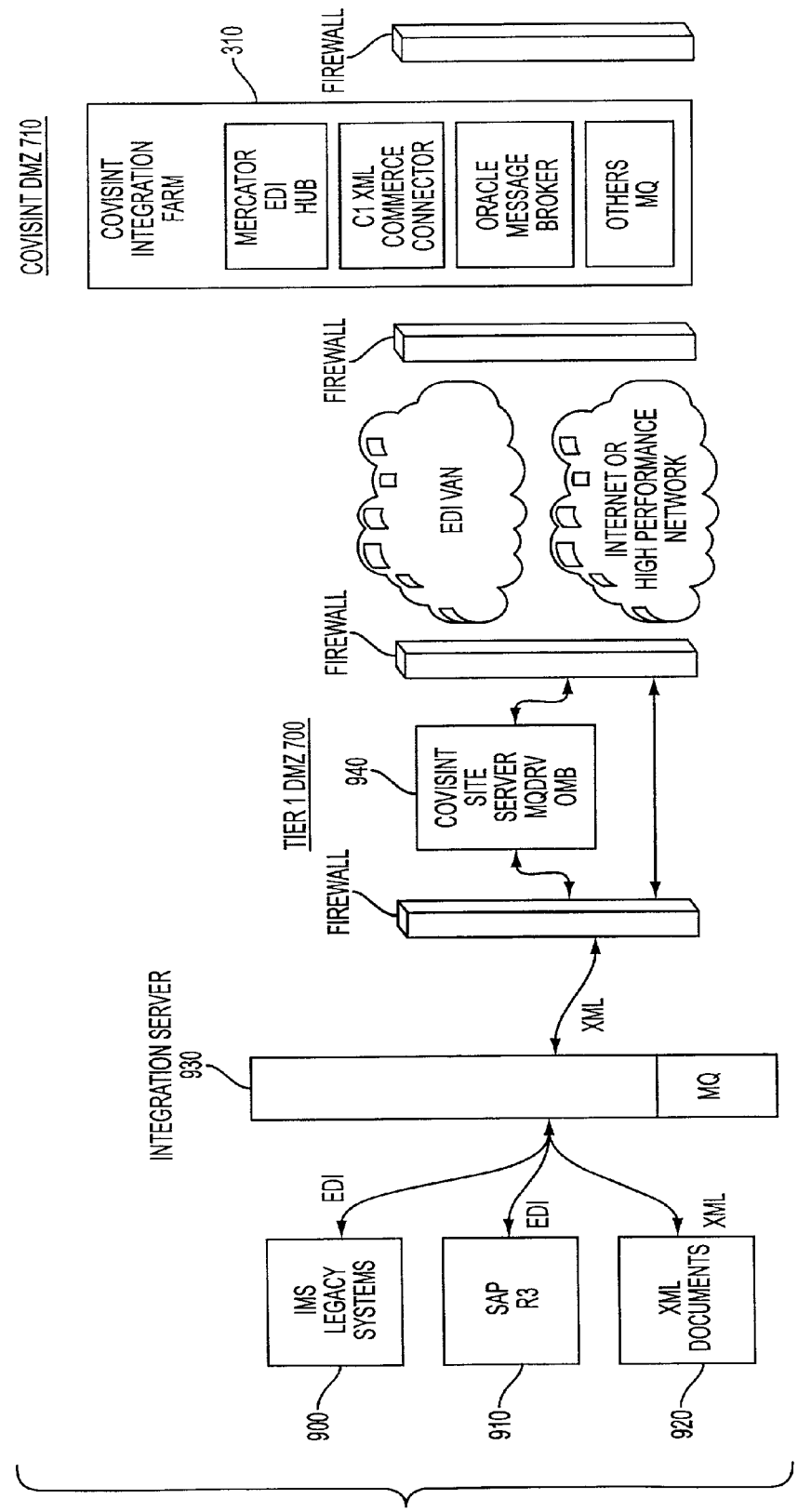

FIGS. 7, 8 and 9 illustrate respective network arrangements for achieving XML "dial tone" to a business to business exchange in accordance with one aspect of the invention.

As shown in FIG. 7, a plurality of OEM systems 720 include OEM Legacy System 730, Oracle I procurement package 740, and OEM supplier network 750. In this figure, connection to the Covisint integration farm 310 occurs over network 730 and an onsite Covisint site server 760. The onsite Covisint site server and Oracle message broker 760 are isolated from the network 730 and from the OEM system 720 by firewalls that together isolate the onsite Covisint site server within an OEM DMZ 700. The term DMZ stands for Demilitarized Zone and reflects the fact the no hostile devices are permitted within the zone. The first firewall protects the OEM's internal systems 720 from the attack through the server. The other firewall adjacent server 760, protects from attacks over the network 730. Thus, the OEM systems are double protected from both network attacks and from attacks that might possibly be based on the site server 760. A similar arrangement protects the Covisint integration farm 310 by walling the integration farm off from attack using firewalls constituting the Covisint demilitarized zone 710. The networks 730 which are commonly used to connect users to the Covisint business to business exchange include electronic data interchange/value added network and/or an Internet or high performance networks. A variety of high performance networks are available for ensuring highly reliable and high speed connection to users.

FIG. 8 shows a similar arrangement except that the connection to the Covisint integration farm 310 is via the eCommerce message queuing server 840 that resides in the OEM demilitarized zone 700. In this case, the user may be using legacy systems 800, SAP, version three 810 or some other software package 820 to access the business to business exchange via, for instance, EAI product/JAVA middleware 830.

FIG. 9, the connection to the Covisint integration form 310 is by way of Covisint site server 940 residing in the tier one demilitarized zone 700. The site server in this case is a message to driven Oracle message broker server. The connection from an integration server 930 to the Covisint site server is XML. The individual types of connection that might utilize this type of an integration server 930 include an IMS legacy system 900, SAP R3 (910) and straight XML documents (920). The integration server 930 provides message queuing driven integration of the incoming information.

Figure 10:
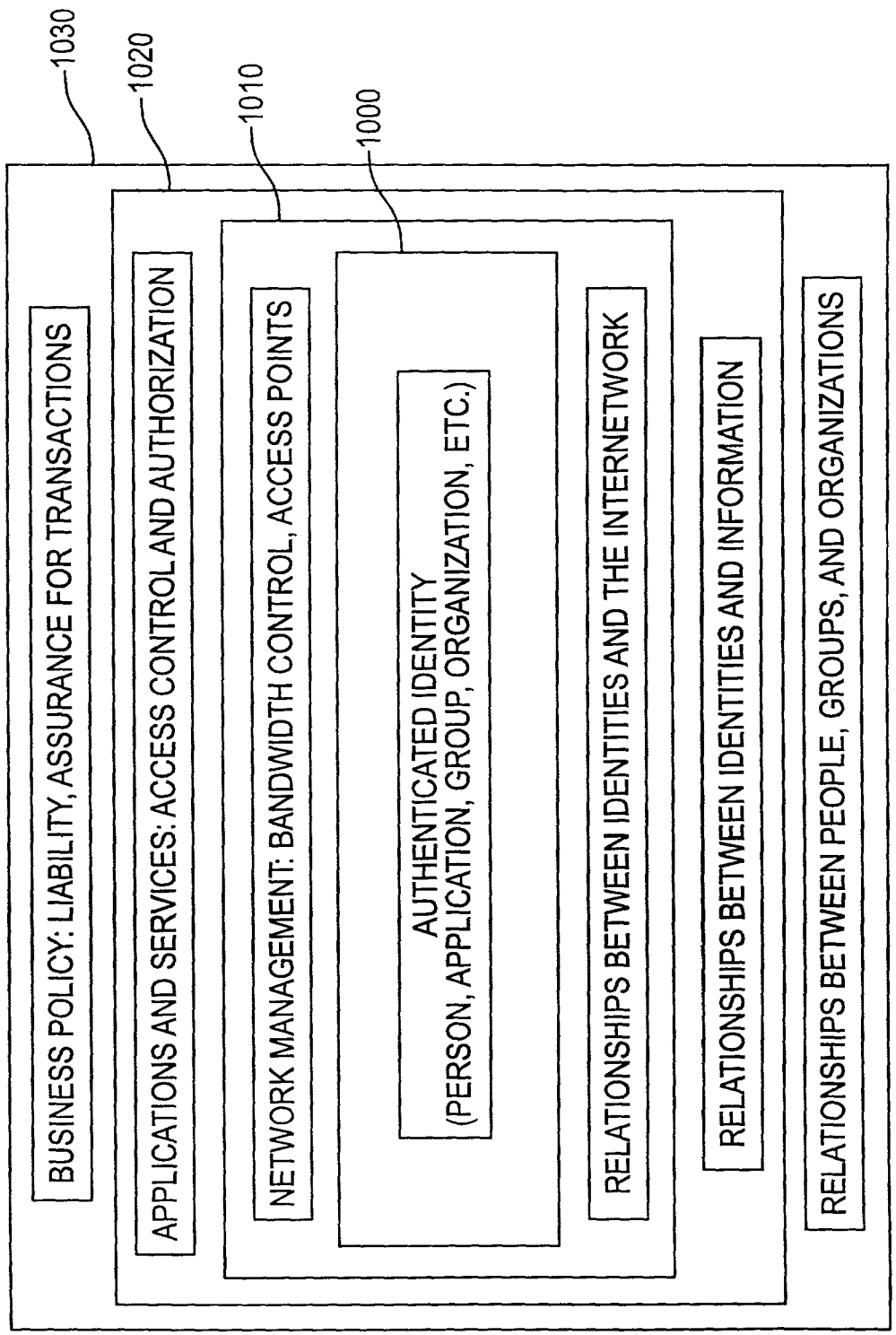
FIG. 10 is a diagram for explaining security design and relationship for a business to business exchange in accordance with another aspect of the invention.

FIG. 10 is a diagram for explaining the security design for a business to business exchange in accordance with one aspect of the invention.

The operation of a business to business exchange requires considerable care in implementation of security. Of the three driving security imperatives for this implementation the first is confidentiality. This implies preventing sensitive information from being disclosed to unauthorized recipients. One needs to minimize or eliminate the risk of financial loss, public embarrassment, or legal liability from unauthorized disclosure of sensitive and/or critical information.

The second imperative is availability. One needs to ensure that systems operate promptly and that services are not denied to authorized users. One needs to prevent missed opportunities or interruption of operations due to the inaccessibility of information.

The third imperative is integrity. One needs to ensure that information resources are changed only as specified in authorized manner. One needs to minimize or eliminate the risk to the business if critical information is accidentally or intentionally manipulated.

A hierarchical approach to security is shown in FIG. 10. The various levels of the hierarchy are illustrated in this figure. In block 1000, one is concerned with the authenticated identity of the person as to person, application, group and organization of a user. In block 1010, the emphasis is in on relationships between authenticated identities and the internetwork. This has to do with network management in the form of bandwidth control and access points. Block 1020 is concerned with the relationships between identities and information and this concern provides access control and authorization to both data and hardware. Finally, block 1030 is directed to the relationships between people, groups and organizations and has to do with the liability and assurance resulting from transactions.

The line between business and technology can be defined in a way that is convenient. In some systems, one may choose to implement contractual relationships between people and groups and organizations using a system based agreement. However, in others, a paper based contract may exist between those people and organizations in order to establish the assurance for transaction guarantees and non-repudiation. To ensure that transactions are properly consummated and products and services delivered and products delivered, one may wish to have organizations and individuals post a bond to ensure their performance.

In operation, a number of security features are utilized to ensure appropriate security. First, a dedicated security team is used which is staffed with Internet security experts. Its sole focus is on the security architecture and policy for the system. Security policies are published and may be audited by all customer organizations. Further, external security audits from an independent third party may be undertaken to ensure the integrity of the security systems put in place. Occasionally, one may desire to contract for ethical hacks to check the production and development environment. The data centers are physically secured, requiring appropriately authorized access and deploy the latest intrusion detection software tools.

There is a distributed security administration so that each company can manage the data that belongs to that company. The data is separated and secured by company. The owner of the person who is a user manages the identification or authentication of that user. The owner of the data manages the access to that data. There is a distributed registration module giving business to business exchange customers control over access to their data. There is a systemwide Covisint Security Administrator who creates/updates company specific corporate security administrator information. At Tier One, there is a Corporate Security Administrator that is company specific who creates/updates company specific user information, assigns exchange use or privileges and authorizations and grants company specific supplier access. There can be and is a n-tier implementation.

End user access can be restricted by employee role, applications they access or information they access. The security features leverage the latest technologies including SSL via https, 128 bit encryption algorithm except for prohibited by law and the use of public key technologies where appropriate. Minimum security baselines are imposed and package application providers will be required to adhere to those and provide verification subject to Covisint audit. Every server and network device has minimum security standards set for it.

As suggested above, XML is key in the drive to integrate the diverse systems in a common business to business exchange. XML serves as the primary information currency of the business to business exchange architecture. Two key components fundamental to XML messaging include content ("payload") and transport in routing. The Open Application Group's business object document (BOD's) serves as the foundation for Covisint XML content definitions. UN/CE-FATC and OASIS provides the definition of Covisint's XML messaging architecture.

Among the value added services shown in the Covisint U architecture of FIG. 2 can be the Asset Capacity Exchange (ACE) which consist of five offerings: idle asset database, forward auctions tool, fixed price listing tool, asset evaluation tool and asset life cycle management service. All of these are designed to work seamlessly with each other and also as stand alone offerings for Covisint customers.

The idle asset database is a system for access by users from a single company that enables an efficient asset recovery process. The term "asset" includes all assets (E.G. fixed assets, machinery and equipment, tooling, expensed items, etc.), inventory (obsolete products) and manufacturing capacity. The offering is targeted specifically at organizations with multiple production facilities. The tool provides visibility within the customer organization of assets that are no longer in use or those that will soon be available for re-use so that they can be disposed of efficiently. For example, assets can be transferred to a new location within the customer's organization for re-use, sold to an outside organization, scrapped, donated to charity, etc. Due to the improved visibility, the transfer, sell, scrap, move, etc. decision making process can be optimized and coordinated across the entire customer organization rather than merely being performed at a single site.

Figure 11:
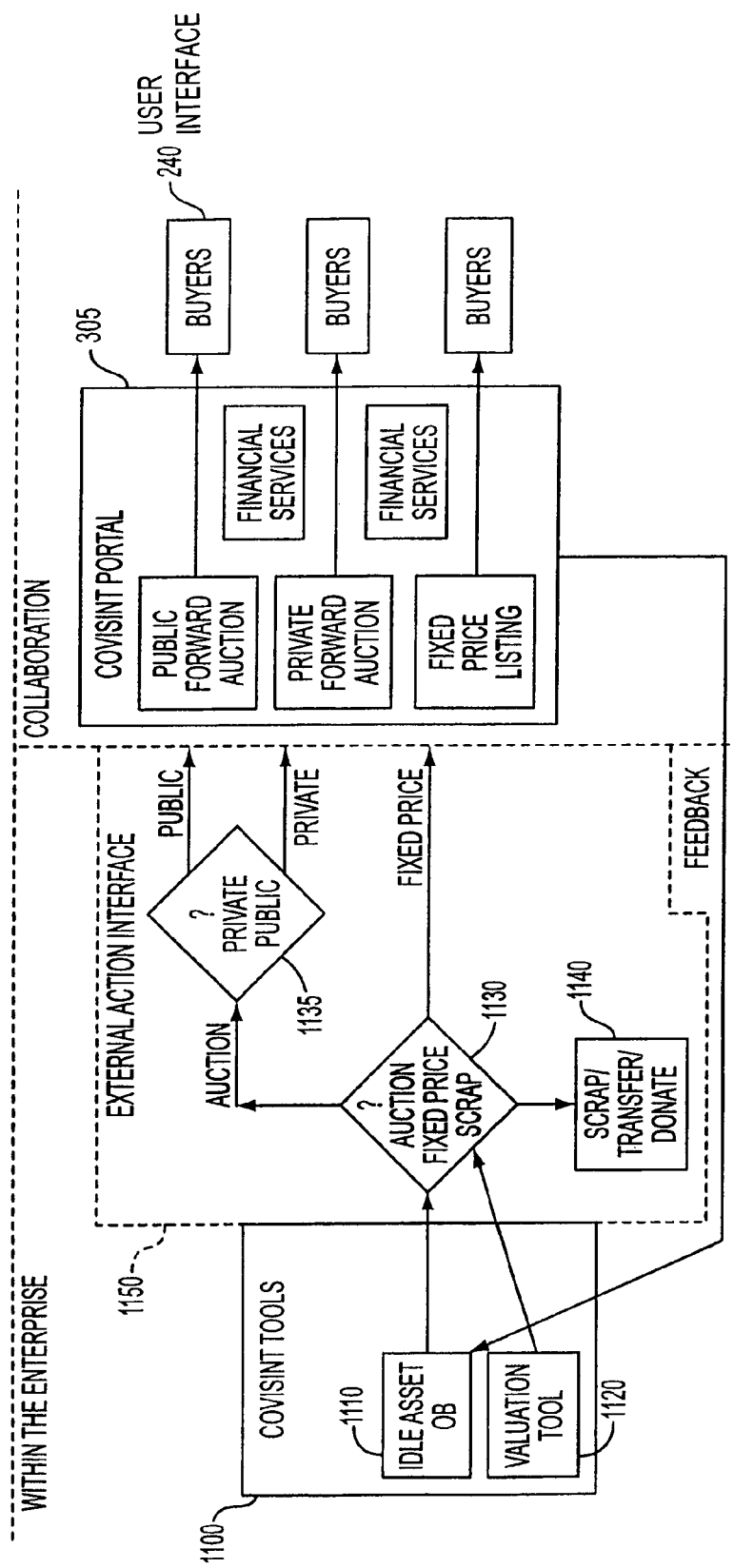
FIG. 11 is a block diagram of an idle asset and capacity exchange system in accordance with another aspect of the invention.

FIG. 11 is a block diagram of an Asset Capacity Exchange system for use in conjunction with the business to business exchange in accordance with one aspect of the invention. Covisint tools 1100 comprising an idle asset database 1110 and optional evaluation tool 1120 are resident within the enterprise being supported by the business to business exchange. The valuation tool 1120 is optional because value can essentially be set by the marketplace using the Covisint portal services 200. However, if implemented, it constitutes a decision support system considering tax, purchase price, useful life remaining, depreciation taken and other information relating to the asset in order to make an informed decision whether to keep the asset or to redeploy it within the company or to dispose of it. The tools 1100 interface with the Covisint portal using an external action interface 1150 which enables the user to make a decision on how to dispose of a particular asset. At 1130 a decision is make whether to auction, fix price or scrap the article. If one scraps the article (1140), the decision then is to whether to scrap it from that facility and transfer it to another location within the company or to donate it to charity to receive a tax benefit. If the decision is to auction it or to engage in a fixed price sale, one can determine whether to make it a public sale or a private sale (1135) Public and private auctions and fixed price listings are provided by the Covisint portal 200.

Figure 12:
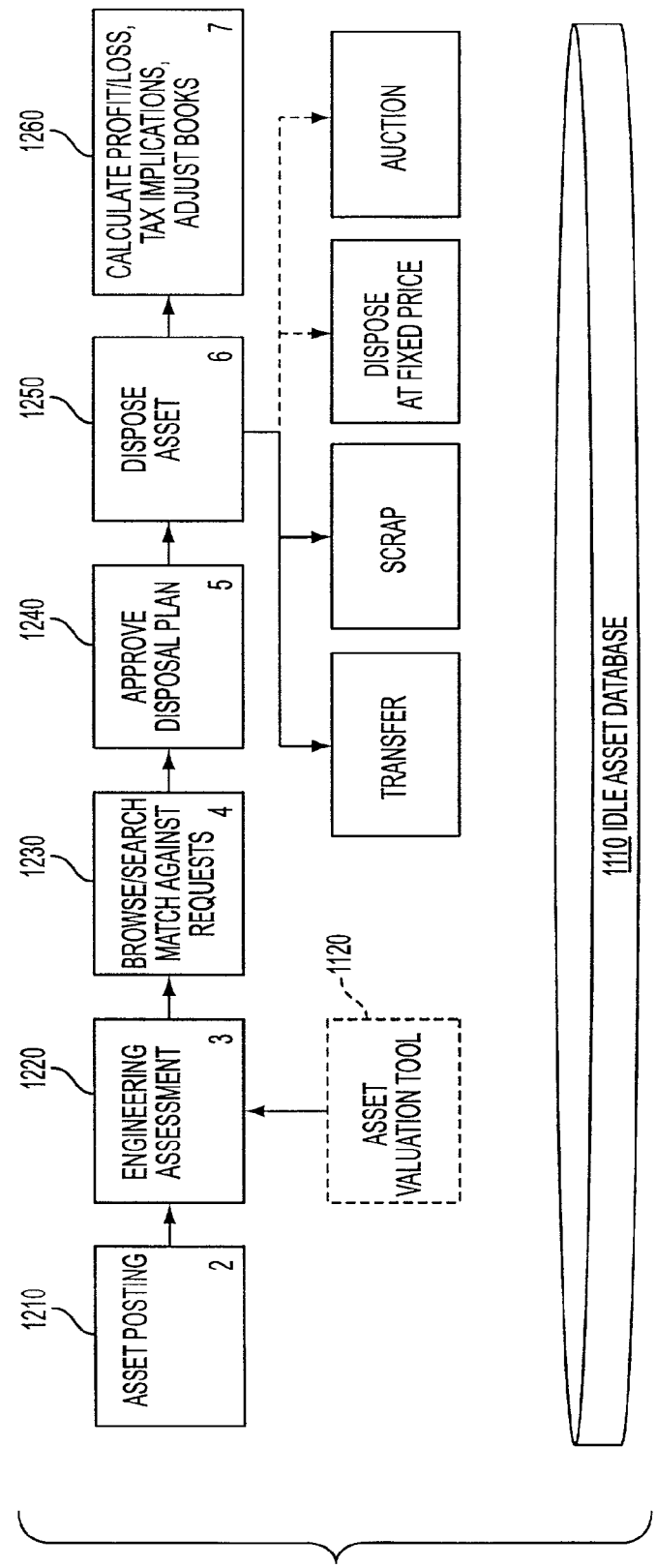
FIG. 12 is a block diagram of an asset recovery process in accordance with another aspect of the invention.

FIG. 12 is a block diagram of an asset recovery process utilizing the asset recovery system in accordance with one aspect of the invention.

Asset Posting 1210

Asset owners (engineering, plant manager etc.) will be able to enter asset information on a pre-defined form through a web interface. Assets may be posted on the database when they become available but in most cases assets will be posted 2-3 years before they come of the production line (Machinery & Equipment). Most of this information may be directly downloaded from the company's asset management system. An interface has to be written between the Idle Asset Database (1110) and customer's legacy systems to enable this transfer.

Engineering Assessment 1220

Engineering assessment will be required for most machinery and equipment. Engineering will valuate an asset, its condition, re-use fittness, dismantling cost, remaining life etc. They can suggest or approve a disposal plan (scrap/re-use/sell etc.)

Browsing/Searching/Matching Against Requests 1230

All users will be able to search and browse all available assets on the Idle Asset database. Users will be able to search using advanced search capabilities. Browsing will be possible as all assets will be arranged in categories and sub-categories. When a user finds an asset fit for his/her needs Idle Asset Database will allow that user to reserve (tag) that asset and initiate a transfer Users will also be able to post a "wanted list" an the database. Asset Recovery Managers will be able to match requests for assets (wanted list) against those posted on the database. If there is a match, all concerned users will be notified via email.

Approval of Disposal Plan 1240

The approval process will be built on configurable workflow. Approval requirements will vary depending upon the value and characteristics (M&E vs expensed item) of the asset. Approvers will be notified of the pending approvals via email. Also, the approval status will be visible to all users. Approvers will be able to approve or disapprove asset disposal plans and provide comments.

Asset Disposal 1250

Once the disposal plan is approved, depending upon the plan, the asset will be transferred, scrapped, or sold. In case the disposal plan requires a sale, the asset information will be transferred to the fixed price listing tool or the auction tool. After the sale is final, all sale information (buyer, price etc.) is transferred back to the Idle Asset Database. When the asset leaves the company premises the departure information will be captured (ship date, carrier, ship to etc.) Triggers will be generated for finance/accounting to calculate profit/loss, tax implications and adjust books.

Calculate Profit/Loss, Tax Implications, Adjust Books 1260

Once an asset disposal is complete (triggered by ship date) finance/accounting will calculate profit/loss, tax implications and adjust the general ledger.

Reporting

All users will be able to run reports, both formal and ad-hoc, depending upon their access privileges. Reporting hierarchy will follow the following general flow Entity→Division→Asset Category→Asset. Reports will include, but will not be limited to:

Asset tracking by entity, division, plant, asset type etc.

History of asset disposal including type of disposal, profit/loss, net proceeds etc.

Status reports—where the asset is in the approval process.

Re-use Vs sales comparison.

No of assets togged at any given time.

Savings generated by Asset Recovery Process.

Legacy Systems

Most of the asset information is stored in a Fixed Asset Management System. This information may be available from some other legacy system depending upon the sophistication of the customer. Asset posting will be easy and quick if an interface between Idle Asset Database and this Legacy System is written. Most of the required information could then be posted by the click of a button and will avoid typing of information saving time. A workaround to writing a direct interface is to use an intermediate medium like an excel worksheet.

Fixed Price Listing Tool

Asset information (asset name, type, manufacturer, mfg. Date, condition, quantity, price etc.) and sale information (buyer contact information, price, quantity etc.) will transfer, between the Idle Asset Database and the Fixed Price Tool if the customer decides to sell the asset at a fixed price. This interface could be automated by writing an interface between the two systems.

Auction Tool

Asset Information (asset name, type, manufacturer, mfg. Date, condition, quantity, reserve price etc.) and sale information (buyer contact information, price, quantity etc.) will transfer between the Idle Asset Database and the Auction Tool it the customer decides to auction the asset. This interface could be automated by writing an interface between the two systems.

Asset Valuation Tool 1120

This tool will enable asset valuation (both engineering and sales). The Idle Asset Database stores asset valuation information, (condition, remaining life, re-use fitness, Fair Market Value etc.) and an interface with Asset Valuation Tool systems will automate data transfer.

Exemplary Use Cases

Company XYZ has 10 production locations and 1 central asset recovery office. Production location 4 is changing its product line up-replacing a welding line with a stamping line. The 10 welding robots that are currently on the line are 2 years old but are no longer required. The plant manager from location 4 enters the details of the welding robots into the database via a set of web screens. All plant managers and the central office staff in Company XYZ have access to the database.

Case 1

The manger at location 9 has won a new contract and can use 5 of the robots on the new production line. The manager at location 9 searches the Idle Asset Database, finds these robots and togs 5 robots for transfer. This transfer is approved by asset recovery manager, division representative, finance representative, engineering etc. Transport of the robots is arranged between the two plants. Accounting and finance calculates tax implications, profit/loss etc, and adjusts the books.

Case 2

No other plant has use for the other 5 robots so the asset recovery group derides to auction them through Covisint. The information on robots is transferred to the Covisint auction tool. Covisint performs an auction to a pre-defined list of invitees. Company XYZ agrees to the highest bid and a sale is confirmed. Sale information is transferred back from the auction tool to the Idle Asset Database. Customer ships these 5 robots to the buyer facility and invoices the buyer, Accounting and finance calculate tax implications, profit/loss etc. and adjusts the books.

Although the invention described herein had been described with reference to a specific example, the invention is not limited to that example, but rather the scope of the invention includes other implementations within the scope of the attached claims.

Appendix A

CD-ROM Contents

The following is a description of the contents of 1 CD-ROM submitted as an appendix to this application:
CD-ROM 1—
This CD-ROM contains Zipped Files. Each zipped file may be opened and the contents viewed using WinZip 7.0 from Nico Mak Computing Inc.
The following files are included:
File Summary—A word document describing the documents.
Billing.zip—(WinZip) compressed billing integration source.
Integration.zip—(WinZip) compressed billing integration source.
Customer Branded Environment (CBE).
0919_oiddb.dmp.Z—(WinZip) compressed oracle database dump common registration/login
0919_portprod.dmp.Z—(WinZip) compressed oracle database dump, containing.
PortaliAS919.tar.Z—(WinZip) compressed tar of Portal web application server.
RegLogiAS919.tar.Z—(WinZip) compressed tar of Registration/Login application server.
DataFlowDiagrams.vsd—(Visio 2000) document containing high level architecture diagrams.
winzip80—An application program for opening zipped files on the CD-ROM.

What is claimed is:

1. A method for operating an industry wide business to business exchange system comprising the steps of:
providing an interface configured to couple a system of each of a plurality of customers to the exchange system;
allowing management of authorized users to access data residing in the system of a respective customer by an entity other than the respective customer;
authenticating an individual user; and
responsive to a result of the authenticating step indicating that the individual user is an authorized user, authorizing the individual user to access data residing in the exchange system and data residing in the system of one of the plurality of customers of the exchange system, wherein the system of each of the plurality of customers of the exchange system is coupled to the exchange system via a data communication network.

2. The method of claim 1, wherein the exchange system allows the individual user to access data residing in the exchange system and data residing in the system of one of the plurality of customers of the exchange system with a single identity authentication step.

3. An industry-wide business-to-business exchange system comprising:
a first subsystem configured to provide user access to the exchange system; and
a second subsystem configured to perform the steps of:
providing an interface configured to couple a system of each of a plurality of customers to the exchange system;
allowing management of authorized users to access data residing in the system of a respective customer by an entity other than the respective customer;
authenticating an individual user; and
responsive to a result of the authenticating step indicating that the individual user is an authorized user, authorizing the individual user to access data residing in the exchange system and data residing in the system of one of a plurality of customers of the exchange system, wherein the system of each of the plurality of customers of the exchange system is coupled to the exchange system via a data communication network.

4. The system of claim 3, wherein the exchange system allows the individual user to access data residing in the exchange system and data residing in one of the plurality of customers of the exchange system with a single identity authentication step.

* * * * *